United States Patent [19]

Acevedo

[11] 3,927,271

[45] Dec. 16, 1975

[54] SEQUENCE CONTROL CIRCUIT FOR TELEPHONE SYSTEMS

[75] Inventor: Generoso Acevedo, Milan, Tenn.

[73] Assignee: International Telephone and Telegraph Corporation, New York, N.Y.

[22] Filed: Sept. 16, 1974

[21] Appl. No.: 506,354

[52] U.S. Cl. .......................... 179/18 AB; 179/27 D
[51] Int. Cl.² .......................... H04M 3/22
[58] Field of Search ............ 179/18 AB, 27 D, 18 F, 179/18 FA, 81 R, 84 R; 317/139; 340/147 IL

[56] References Cited

UNITED STATES PATENTS

| | | | |
|---|---|---|---|
| 2,787,741 | 4/1957 | Bretschneider | 317/139 |
| 3,142,728 | 7/1964 | MacLeod | 179/18 AB |
| 3,275,754 | 9/1966 | Howell et al. | 179/18 AB |

*Primary Examiner*—Thomas A. Robinson
*Attorney, Agent, or Firm*—James B. Raden; Marvin M. Chaban

[57] ABSTRACT

A circuit is disclosed for controlling the sequence of selection of switch units such as trunk circuits, junctor circuits or other selectable switches to ensure that successive calls are made through different ones of said switches. Following seizure of a switch and subsequent release of that switch, the control unit is artificially busied against seizure as long as one available switch unit of those available has not been seized. When the final unit of a group is seized, the remaining units of the group are then released and made available for selection.

5 Claims, 1 Drawing Figure

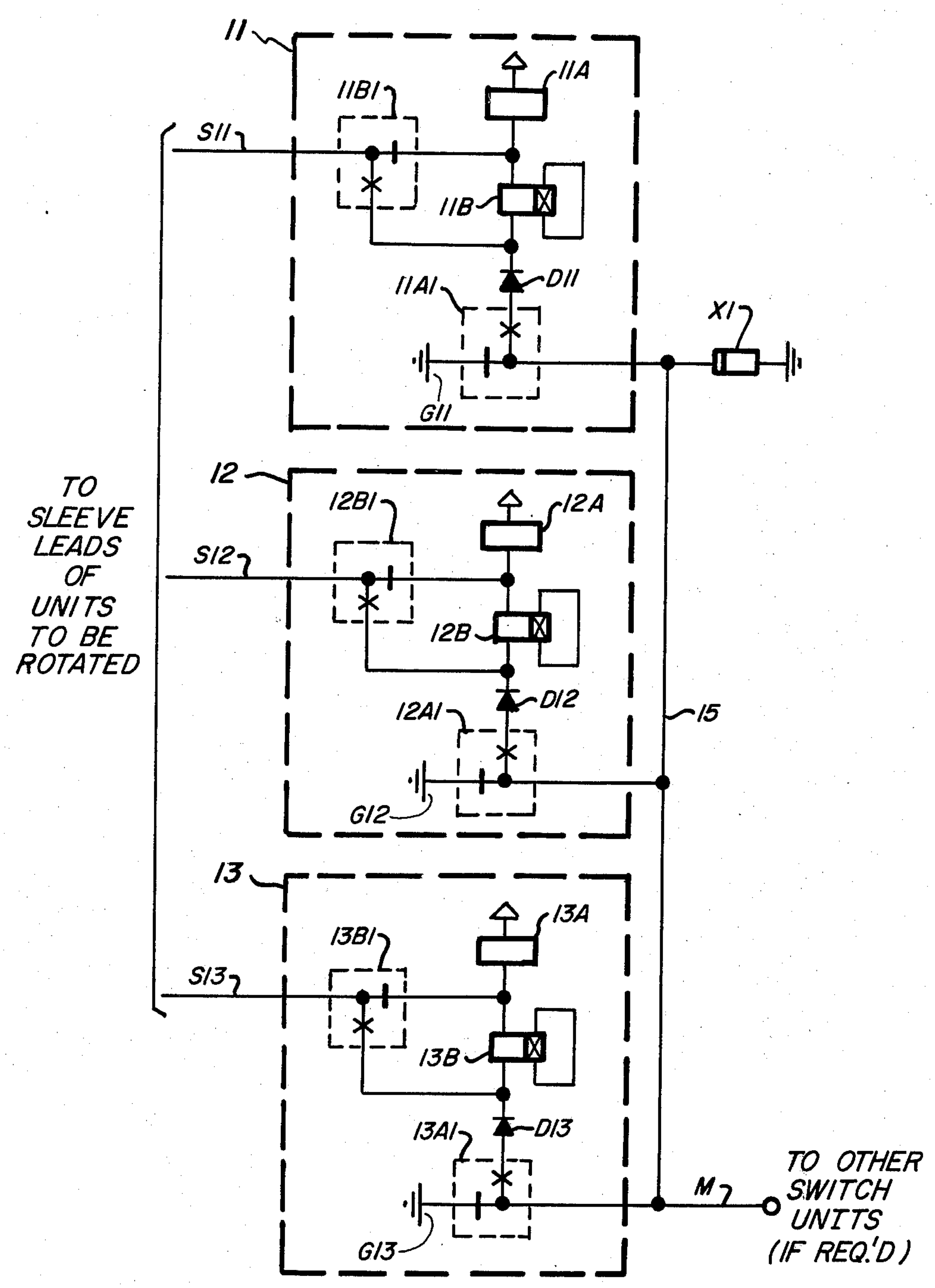
11
11B1
11A
S11
11B
11A1
D11
X1
G11
12
12B1
12A
S12
12B
D12
12A1
15
G12
TO SLEEVE LEADS OF UNITS TO BE ROTATED
13
13B1
13A
S13
13B
13A1
D13
M
TO OTHER SWITCH UNITS (IF REQ'D)
G13

SEQUENCE CONTROL CIRCUIT FOR TELEPHONE SYSTEMS

BACKGROUND OF THE INVENTION

Certain telephone equipment specifications require that successive calls or successive attempts at seizure of switches of a group do not allow seizure of the same switch within a group. For example, the REA specification states that each of three successive calls shall use different switches except where there are but two switches in a group in which case they shall be used alternately.

In order to implement this requirement, a number of approaches have been used. In one known approach, a three relay sequence is provided in each switch with the contacts of the switches interrelated.

Other approaches may use allotting switches and the like to process successive calls through successive switches.

SUMMARY OF THE INVENTION

The invention provides a sequence control circuit for a switch in a telephone system to insure that the same switch is not seized on successive seizure attempts within a group. Each switch has a control unit, the group of units being connected through a common holding path for one or more relays in the control unit through the remaining idle units to artificially busy a switch once it has been seized for use. Release of the artificial busy condition is provided by operation of the final control unit of the group.

It is an object of the invention to provide an automatic sequencing circuit which artificially busies a circuit on use and releases the artificial busy when all circuits of the group have been used.

It is a further object of the invention to provide an improved sequencing or rotation control circuit for each switch of a group using but two relays per control circuit.

It is still a further object of the invention to provide a sequence control circuit which uses a slow-to-operate hold relay, the operate delay being sufficient to release the seizing apparatus.

Other objects, features and advantages of the invention will become apparent from the following description viewed in connection with the drawing.

BRIEF DESCRIPTION OF THE DRAWING

The drawing is a schematic circuit diagram of an embodiment of my invention.

DETAILED DESCRIPTION OF THE DRAWING

In the drawing, I show sequence control units 11, 12 and 13, three being shown. It is understood that any number of circuits such as 11–13 may be provided and connected in a group in a like manner. These control units may be part of or merely associated with switches such as trunks, junctors, links, selectors, connectors, linefinders. The switches are ones in which a plurality of switches or circuits of the same type are available for successive selection. Certain specifications require that seizure and use of such circuits be spread among the available circuits. Thus, where the circuits are grouped, the selection process must prevent successive seizure attempts from reaching the same unit and should stagger the use among the circuits of a group as evenly as possible.

Each such control unit as shown by the drawings has an S or sleeve lead over which the unit and its switch are searched for the idle or busy condition of the switch or circuit, a busy condition being characterized by a ground on the sleeve lead. On the searching circuit finding ground on the sleeve lead of a control unit such as unit 11, the unit and its switch are passed and an attempt is made to seize the next switch control unit 12. If both are busy, control unit 13 and its switch are seized.

The principle of the present invention is that of artificially busying a control unit such as 11 after its seizure and release. With the first switch unit 11 busy, the next unit 12 is seized by the next attempt. Unit 12 is then artificially busied along with switch unit 11 to cause the next attempt to go to switch unit 13. When the last switch unit of the group, unit 13 of the present example, is seized, the artificial busy condition on all subsequent switches is released.

The sequence control units 11, 12 and 13 may be independent control entities associated with or representing a switch unit, or may be part of the actual switch itself, the remaining parts of the switch unit not being shown since it is not relevant to the substance of the present invention. In any event, seizure of the control unit effects seizure of the switch represented by the control unit.

Each sequence control unit 11, 12 and 13, as shown, has two relays indicated as A and B, the relays being designated as 11A and 11B for unit 11, 12A and 12B for unit 12, and 13A and 13B for unit 13. Each relay has one break-make combination respectively designated as A1 and B1 with a designation for the specific control unit 11, 12 and 13.

The A relay of each unit is normal in its operate and release characteristics while the B relay may be slugged or wired to provide a slow-to-operate and normal release characteristics.

A common lead 15 is connected to the M terminal to other control units of the group. Lead 15 is connected through the respective A1 contacts to a source of ground potential at G11, G12 and G13. A spark control network X1 is connected to lead 15 for spark suppression on the A1 contacts of the final control unit, the spark suppression network using any conventional techniques.

Turning now to the operation of the circuit, assuming all control units and their represented switches are available, the absence of ground on lead S11 indicates the switch unit including or represented by unit 11 is available. A ground potential is then applied to sleeve lead S11 by apparatus (not shown) seeking use of the switch unit. This ground potential passes through the closed set of contacts 11B1 and the winding of relay 11A to battery causing relay 11A to operate. The diode D11 prevents the sleeve lead groudn potential from passing to the remaining units over lead 15 and terminal M and prevents operation of relay 11B.

Relay 11A operates and switches its contacts 11A1 to open the ground potential path to 11G1 to common lead 15 and to relay 11B. The switch represented by the unit may then be used in the normal manner depending on its type and manner of use.

When the use of the switch represented by control unit 11 is ended, ground is removed from sleeve lead S11 by the prior apparatus. The 11A relay remains operated from battery through its winding and over a hold path through the winding of relay 11B, diode D11 closed contacts 11A1 and lead 15 to the closed contacts of 12A1 and 13A1 to ground at 12G and 13G. As long as at least one of these ground paths is closed, (indicating at least one idle switch) relay A-11 remains operated. After a time interval sufficiently long to allow the prior apparatus to release, slow-to-operate relay B operates over the path to ground 12G and 13G. Relay B operates and switches its contact sets 11B1 to open the original sleeve lead operate path to relay 11A and to close a path from the ground at 12G and 13G, closed contacts 11A1, diode D11 and the closed 11B1 contacts.

Relay B locks over this path and places artificial busy ground on lead S11 marking control unit 11 as busy.

On an attempted seizure of a switch control, unit 11 will show as busy and an attempt will be made over unit 12 which is then available. Control unit 12 will operate in the manner described for control unit 11. As long as one switch and its control unit remains idle, the B relays of prior control units of the group (11 and 12) will be held operated to artificially busy the switch units against seizure.

With control units 11 and 12 busy, either artificially or with their switch in use, control unit 13 will be seized on the next attempt. The A relay of unit 13 will operate and remove the holding ground for subsequent switches 11 and 12. Relays A and B in units 11 and 12 will release on removal of the hold ground and be available for selection. The slow-to-operate characteristics of the B relays will prevent re-seizure of a B relay due to the release of the A contacts over a path to ground at a remaining switch unit.

I claim:

1. A sequence control network for plural switches of a group within a telephone system, said network comprising a plurality of control units, each representing one of said switches, a first lead in each of said units over which the switch may be tested for availability and seized, a first and a second relay in each unit, said first relay of a unit responsive to seizure of said unit for enabling a path to the second relay of said unit, a source of potential at each unit of said group, a common lead from the potential source to all said units, means in a unit responsive to operation of the first relay of that unit for disconnecting said potential source from said common lead, and means for completing a path through any idle one of said units for operation of an enabled second relay of a busy unit for holding said second relay operated to artificially busy said unit, said disconnecting means of a last idle one of said units opening the path to the second relay of all other units to release all second relays of said units.

2. A sequence control network as claimed in claim 1, wherein said second relay comprises a slow-to-operate relay, and said path completion to said second relay occurs on release of seizing current to said first relay, and said first relay held operated with said second relay.

3. A control network as claimed in claim 2, wherein each of said relays has a break-mate set of contacts, and a break-mate contact set of each first relay is included in the operating path to the second relay of all of said units.

4. A circuit for rotating selection of like switches of a group comprising a control unit for each switch of said group, first relay means in each unit responsive to seizure of the unit over a lead for busying said unit over said lead, second relay means in a unit operative after a busying of that unit over a path through contacts of relay means in any idle one of said units for artificially maintaining said busying in effect after removal of said seizure, and means in any one unit responsive to busying of all units of said group for releasing all other units.

5. A circuit as claimed in claim 4, wherein there is a first relay which comprises the means responsive to seizure of a unit, and a second relay comprises the busying means, and said second relay is slow-to-operate and said contacts comprises contacts of said first relay means.

* * * * *